May 28, 1968
A. V. RICE
3,385,922
ELECTRICAL CONNECTOR WITH HERMETIC
SEALING UTILIZING POLYMERIZATION
Filed July 27, 1965
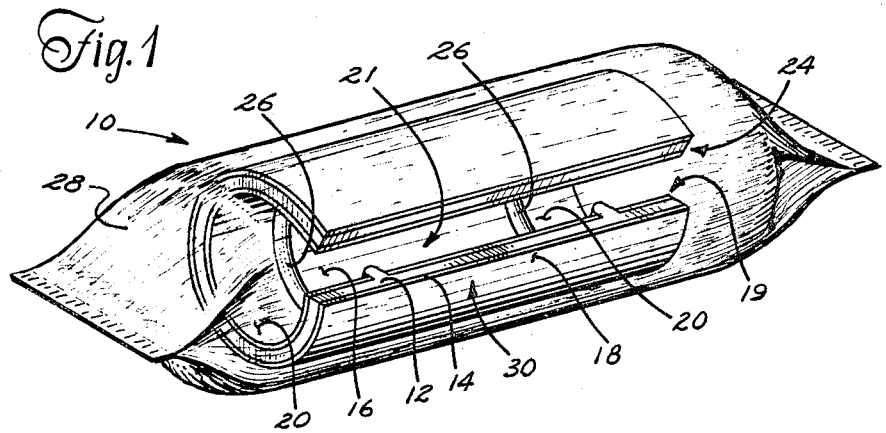
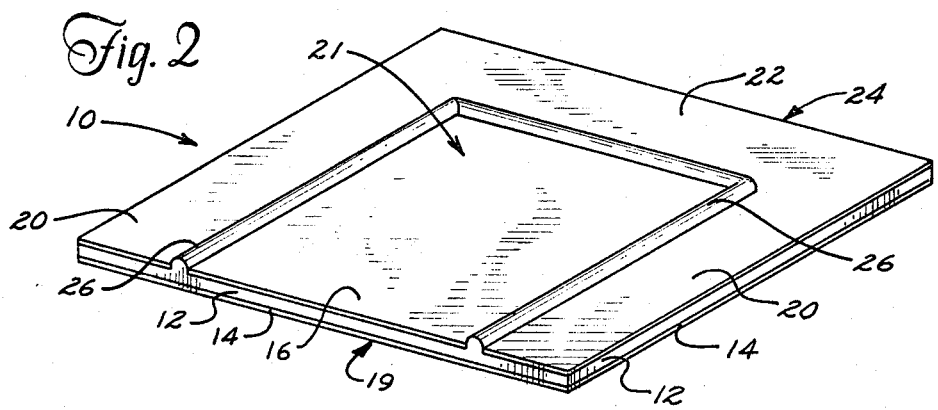
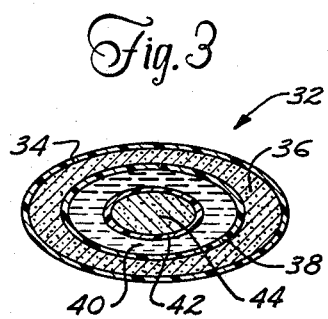
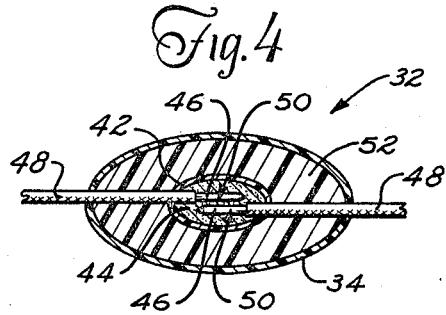
INVENTOR
ALVIST V. RICE
BY *Lawrence R. Hefter*
ATTORNEY 3,385,922
ELECTRICAL CONNECTOR WITH HERMETIC
SEALING UTILIZING POLYMERIZATION
Alvist V. Rice, Fairfax County, Va., assignor to The
Susquehanna Corporation, a corporation of Delaware
Filed July 27, 1965, Ser. No. 475,105
7 Claims. (Cl. 174—84)

ABSTRACT OF THE DISCLOSURE

In one embodiment, the connector is made of an electrically-insulated split sleeve made of a deformable material such as a lead alloy or plastic. The inner surface of the sleeve is coated with an electrically-conductive, water-reactive, polymerization system, and the sleeve is enclosed in a water-impermeable jacket made of a material such as polyethylene. When it is desired to join wires to make the connection, the jacket is removed and the connector is exposed to the air for about a minute to permit the water-reactive polymerization system to absorb moisture. Then the wires are placed within the sleeve, and the sleeve is crimped to seal tightly the wire ends in a firm connection. Because the bond that seals the connector and joins the wires results from a polymerization process with no evaporation of solvent, a vent through the sleeve is not required and the connection is hermetically sealed as it is formed.

---

This invention relates to an improved wire connector. More particularly, this invention relates to a self-contained connector capable of firmly connecting wires in an insulated, hermetically sealed connection without any requirement for energy from an external source.

Numerous applications require a means of joining two or more wires in a connection which will ultimately be utilized in an inaccessible location. Electrical connections in spacecraft or in underwater cable are typical examples. Such applications require connectors which can be depended upon to form a firm connection. These applications also require a connection which is hermetically sealed to prevent contamination or corrosion. More common situations, such as mending wire fences and everyday household repairs, require a means of rapidly and firmly connecting wires in a connection which will not loosen during subsequent movement or use. Some household repairs, such as those to electrical wiring, require the forming of an insulated electrical connection. In these and other applications it is desirable to make a connection rapidly and, frequently, without the use of heat or other external energy.

Many connectors are presently available for joining wires. Some of these rely solely upon the mechanical twisting or interlocking of one wire about another or upon the interlocking of each wire to a connector to provide both mechanical strength and electrical continuity. These connectors do not insure a firm connection that will not loosen with vibration and mechanical stress, and they permit contamination and corrosion of the wires which impairs the electrical continuity of the connection. Other existing connectors require the application of heat or other energy to solder the wires. While this improves the mechanical connection and the electrical continuity, it is a time consuming process requiring the availability of a heat source and considerable skill. Furthermore, standard soldering techniques frequently result in flux contamination of the wires. Other connectors exist which, upon insertion of the wires, solder them together by the evaporation of a solvent from a liquid solder solution. While this is rapid, easy, and achieves a firm connection, the soldered joint must be exposed to the atmosphere to permit evaporation of the solvent. Thus, to achieve a hermetically sealed connection, the hermetic seal must be made as an additional step after the solvent has had time to evaporate. The present invention permits the firm connection of wires in a hermetically sealed connection without any of the above difficulties.

One object of this invention is to provide an inexpensive connector which easily and rapidly joins wires in a firm connection.

Another object is to provide an improved connector in which wires can be firmly joined without energy from an external source.

Another object is to provide an improved connector in which wires are rapidly and firmly joined in a connection which provides electrical continuity between the wires.

Another object is to provide an improved wire connector in which the connection is hermetically sealed as it is made.

These and other objects and advantages are achieved in the subject invention. Briefly, one embodiment of this invention comprises a connector in the shape of an electrically insulated, split sleeve made from a deformable material. The interior surface of the sleeve is coated with a water-reactive polymerization system, and the sleeve is enclosed in a water-impermeable container. When it is desired to join wires with the connector, the enclosing container is removed, and the connector is exposed to the air for about a minute so that the water-reactive polymerization system will absorb moisture. Then the wires are placed within the sleeve, and the sleeve is crimped to tightly seal the wire ends in a firm connection. If electrical continuity is desired, a portion of the polymerization system is made electrically conductive by the addition of a conductive material. Since the bond sealing the connector and the bond joining the wires to the connector results from a polymerization process and not from evaporation of a solvent, a vent through the sleeve is not required. Thus, the connection is hermetically sealed while it is formed.

The objects and advantages of the present invention will be apparent from the following description and claims, together with the accompanying drawing, in which:

FIGURE 1 is a perspective view of a connector and enclosure therefor formed in accordance with a first embodiment of the invention, FIGURE 2 is a perspective view of the connector of FIGURE 1 in sheet form prior to final shaping, FIGURE 3 is a sectional view of a connector formed in accordance with a second embodiment of the invention, and FIGURE 4 is a sectional view of the connector of FIGURE 3 showing wires joined thereby.

A first embodiment of the invention is shown in FIGURE 1. In this embodiment, a connector 10 takes the form of a split sleeve 12 made of a malleable or deformable material, which could be a metal, such as a lead alloy, or a plastic, such as polycarbonate, both of which are capable of being deformed at normal room temperature. The sleeve 12 is originally in the form of a flat sheet, as shown in FIGURE 2, and is shaped by curling it into a C shape connector 10, as seen in FIGURE 1. When the sleeve 12 is made of an electrically conductive material, its outer surface is coated with any suitable insulation 14, for example a flexible epoxy. When the sleeve 12 is made of a material which is electrically non-conductive, no insulation is required on its outer surface.

On the inner surface of the sleeve 12 an area 16 is coated with an electrically conductive, water-reactive polymerization system, often referred to as a water-reactive adhesive. Along the lower lip 18 of sleeve 12, area 16 is bounded by the edge 19 of the sleeve 12. Narrow strips 20 border the two sides of area 16 on the inner surface 21 of sleeve 12, and another strip 22 on the inner surface borders area 16 along upper lip 24. Strips 20 and 22 are coated with a water-reactive adhesive which is not electrically conductive. A ridge 26 protruding from the inner surface 21 of the sleeve 12 lies between the area 16 and the strips 20 and 22. The ridge 26 separates the adhesive in area 16 from that in strips 20 and 22.

The water-reactive adhesive on strips 20 and 22 might be any commercially available silicon sealant, such as a silicon resin mixed with acetic acid in non-aqueous form which hardens or cures on exposure to air from which it can absorb moisture. The adhesive in area 16 might be this same silicon sealant to which has been added an electrically conductive filler, such as metallic flakes. To prevent the adhesive from absorbing moisture from the air before it is desired to use the connector, the sleeve 12 is enclosed in an air-tight, water-impervious container 28 as shown in FIGURE 1. Container 28 can be of any material impervious to moisture, such as polyethylene. The manufacturing process is carried out in a room having controlled low-moisture content in order that the air within container 28 does not contain sufficient moisture to activate the adhesives.

When it is desired to connect a plurality of wires, the connector 10 is removed from the container 28 and is exposed to normal atmosphere for a minute or so to permit the water-reactive adhesive to absorb moisture from the air. To cause electrical continuity between the wires, insulation must be removed from a portion of each wire which will be in contact with the electrically conductive adhesive in area 16; and, to insure insulation and hermetic sealing of the completed connection, the insulation must not be removed from that portion of the wire in contact with the non-conductive adhesive on strips 20.

The wires are placed within connector 10, preferably through each open end of the cylinder, and using pliers or other means, the connector 10 is crimped so that strip 22, along the inner surface adjacent to the upper lip 24, contacts area 30 on the outer surface of connector 10 adjacent to the lower lip 18. Edge strips 20 are crimped to close the ends of connector 10 on the wires. Ridge 26 will close upon itself and the inserted wires, thus insuring a tight seal. The hermetically sealed, insulated connection is then completed by lightly crimping the center section of connector 10 to insure that the bare portion of the wires are in contact with the electrically conductive adhesive in area 16. Ridge 26 prevents the conductive adhesive in area 16 from escaping from the sleeve 12, thus insuring electrical insulation of the connection.

Minor modifications can be made to this embodiment for specific applications. For example, if it is not necessary to have electrical continuity between the wires which are joined, then the entire inner surface is coated with non-conductive adhesive. Since such a connector would be utilized in applications in which electrical insulation is not necessary, insulation 14 is not required on the outer surface of sleeve 12. As a second example, if electrical continuity is necessary but insulation of the connection is not essential, the entire inner surface of sleeve 12 is coated with an electrically conductive adhesive and insulation 14 is not provided.

A second embodiment of the invention is shown as a connector 32 in FIGURE 3. Connector 32 is formed of a housing or jacket 34 made of a flexible but tough material such as a polyethylene. Jacket 34 surrounds a polymerizable ingredient 36 and a second container 38. The second container 38 is made of an easily rupturable material such as cellophane and has within it a catalyst 40 and a third container 42. Within the third container 42 is an electrically conductive material 44.

When it is desired to join two or more wires with connector 32, the flexible jacket 34 is kneaded to cause the second container 38 to rupture. Continued kneading intermixes the polymerizable ingredient 36 and the catalyst 40. The third container 42 remains in the middle of the mixture. Third container 42 is made of a material which will not rupture when jacket 34 is kneaded but which can be easily punctured by the wires to be joined. A polyethylene is suitable. Insulation is removed from the ends of the wires to be joined where they will contact the conductive material 44 within the third container 42, and the wires are then inserted through jacket 34, through the mixture of polymerizable ingredient 36 and catalyst 40, and into the third container 42 where they contact the electrically conductive material 44. The ends of the wires will readily puncture the jacket 34 and the third container 42, and so it is not necessary to use a tool for that purpose. Due to the elastic nature of polyethylene, the openings formed will close about the wires, and, since the polymer forming as a result of the mixing of polymerizable ingredient 36 and catalyst 40 does not readily flow, little of the polymer will escape through the openings, and none of the electrically conductive material 44 will escape from within the polymer.

FIGURE 4 shows two wires 46 joined by connector 32. Insulation 48 has been removed from a portion of each wire which is in contact with the conductive material 44 inside the third container 42 which is within jacket 34. Thus, an uninsulated portion 50 of each wire is in contact with the conductive material 44, and so electrical continuity exists between the wires. The third container 42 is surrounded by a layer 52 of non-conductive material. The insulation 48 has not been removed from the wires 46 in the non-conductive area outside the third container 42; and so the non-conductive layer 52 joins the insulation 48 of the wires to give an insulated, hermetically sealed connection.

The polymerizable ingredient 36 can be any of several well-known substances, such as an epoxy resin or a silicon resin. Catalyst 40 is selected to react with the polymerizable ingredient 36. Not every catalyst will react with every polymerizable substance, and the catalyst and the polymerizable ingredient must be selected so that they will interact to give a resulting polymer with the desired qualities of strength and toughness. Many such combinations of polymerizable ingredients and catalysts are well-known. For example, if the polymerizable ingredient is an epoxy resin, then the catalyst could be an amine which will effect curing at room temperature, such as diethylenetriamine. If the polymerizable substance is a silicon resin, the catalyst could be acetic acid. Since the chemical process of forming a firm polymer as a result of the intermixing of a polymerizable ingredient and a catalyst is not, per se, the subject of this invention, further detail on these components is not required.

Again, minor modifications to the second embodiment of the connector are possible for particular applications. If electrical conductivity is not required, electrically conductive material 44 and the third container 42 are left out. Thus, jacket 34 will contain only polymerizable ingredient 36 and a rupturable container 38 filled with a catalyst 40. If electrical continuity is required, but insulation of the connection is not essential, then the electrically conductive material is disbursed in either polymerizable ingredient 36 or catalyst 40, rather than in a separate container, or a polymerization system with inherent electrical conductivity is used.

As described, the second embodiment is most suitable for a 20 gage wire or heavier which is capable of puncturing the polyethylene container. If it is necessary to connect a lighter wire, then a thinner, more easily punctured flexible jacket 34 and third container 42 are used.

The above embodiments of the present invention constitute preferred forms of a connector which enables the rapid forming of a firm hermetically sealed connection of a plurality of wires, which may or may not provide electrical continuity and electrical insulation, as desired. It is to be understood that other embodiments might be adopted, all coming within the scope of the invention, as defined in the following claims.

What is claimed is:

1. A connector for joining a plurality of wires and hermetically sealing the junction formed comprising
   a deformable member for receiving the wires to be joined, said member having an internal surface at least a portion of which is coated with a water-activated polymerization system, and at least part of said system being electrically conductive,
   and removable separation means for preventing the activating of said system until it is desired to join said wires,
   whereby said separation means may be removed to permit moisture from the air to activate said polymerization system to effect solidification thereof.

2. A connector as defined in claim 1 wherein said member has on its outer surface a coating of an electrically insulating material.

3. A connector as defined in claim 1 wherein said member is formed of an electrically insulating material.

4. A connector as defined in claim 3 wherein said separation means is an air-tight, moisture-impervious container.

5. A connector as defined in claim 1 wherein said member further includes on its internal surface a ridge which defines the part of said system which is electrically conductive, said ridge also serving to make a tight seal when said junction is formed.

6. A connector for joining a plurality of wires and hermetically sealing the junction formed comprising
   a first flexible housing made of a tough elastic material and containing a polymerizable ingredient and a second flexible housing,
   said second flexible housing made of an easily rupturable material and containing a catalyst for said polymerizable ingredient and a third housing made of a tough material,
   said third housing containing an electrically conductive filler material,
   wherein kneading of said connector causes said second flexible housing to rupture, thereby effecting intermixing of said polymerizable ingredient and said catalyst,
   thereby resulting in said third housing filled with electrically conductive filler material being surrounded by an electrically non-conductive polymer,
   said first and third housing being designed to be punctured by insertion of the plurality of wires during the making of the junction, resulting in said electrically conductive filler material establishing electrical continuity between said plurality of wires,
   said wires after insertion being encased by said electrically non-conductive polymer outside of said third housing to form an insulated, hermetically-sealed junction.

7. A connector for joining a plurality of wires and hermetically sealing the junction formed comprising
   a first flexible housing formed of a tough elastic material,
   a second housing formed by an easily rupturable material,
   one of said first and second housings containing a polymerizable ingredient and the other of said housings containing a catalyst for said polymerizable ingredient,
   said ingredient and said catalyst being separated by the rupturable material of said second housing,
   a third housing in contact with at least one of said first and second housings and containing an electrically-conductive filler material for providing electrical continuity between said plurality of wires,
   wherein kneading of said connector causes rupturing in the material of said second housing, thereby effecting intermixing of said polymerizable ingredient and said catalyst,
   resulting in said third housing, containing the electrically conductive filler material, being in contact with the electrically non-conductive polymer formed by said intermixing of said polymerizable ingredient and said catalyst,
   said first and third housing being designed to be punctured by insertion of the plurality of wires during the making of the junction, resulting in said electrically conductive filler material establishing electrical continuity between said plurality of wires,
   said wires after insertion being encased by an electrically non-conductive polymer outside of said third housing to form an insulated hermetically-sealed junction.

References Cited

UNITED STATES PATENTS

| 2,209,743 | 7/1940 | Xenis | 174—84 |
| 2,310,292 | 2/1943 | Humphner | 117—122 |
| 3,083,260 | 3/1963 | Bird. | |
| 3,087,606 | 4/1963 | Bollemier et al. | |

DARRELL L. CLAY, *Primary Examiner.*